US012404984B2

(12) United States Patent
Salas et al.

(10) Patent No.: US 12,404,984 B2
(45) Date of Patent: Sep. 2, 2025

(54) LIGHT SYSTEM WITH A CUSTOMIZABLE IMAGE REGION

(71) Applicant: Valeo Vision, Bobigny (FR)

(72) Inventors: Amanda Salas, Troy, MI (US); Brant Potter, Troy, MI (US); John Orisich, Seymour, IN (US)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 18/541,233

(22) Filed: Dec. 15, 2023

(65) Prior Publication Data

US 2025/0198590 A1 Jun. 19, 2025

(51) Int. Cl.
*F21S 43/31* (2018.01)
*F21S 43/237* (2018.01)
(Continued)

(52) U.S. Cl.
CPC ............. *F21S 43/31* (2018.01); *F21S 43/237* (2018.01); *F21V 23/005* (2013.01); *F21W 2103/60* (2018.01); *F21W 2107/10* (2018.01)

(58) Field of Classification Search
CPC ........... F21W 2102/13; F21W 2103/20; F21W 2102/40; F21W 2103/00; F21W 2104/00; F21W 2103/45; F21W 2103/55; F21W 2105/00; F21W 2107/10; B60Q 2400/50; B60Q 2400/40; B60Q 1/547; B60Q 1/26; B60Q 1/268; B60Q 1/2696; B60Q 1/304; B60Q 1/346; B60Q 1/442; B60Q 1/503; B60Q 1/525; B60Q 1/543; B60Q 1/544; B60Q 1/545; B60Q 1/549; B60Q 1/30; B60Q 1/46; B60Q 1/2665; B60Q 1/2607; B60R 2001/1215; B60R 1/1207; B60R 1/12; B60R 1/06; B60R 1/0602; B60R 1/26; B60R 11/04; B60R 2001/1253; B60R 2011/004; B60R 2011/0085; G09F 21/049; G09F 21/04; Y10S 362/80; G02B 19/0066; G02B 27/0101; G02B 27/0103; F21Y 2115/10; F21S 43/14; F21S 41/00; F21S 41/143; F21S 41/148; F21S 41/151; F21S 41/16; F21S 43/16; F21S 43/245; F21S 43/247; F21S 43/40; F21S 41/25; G09G 2380/10; G02F 1/133606; B60K 35/23;
(Continued)

(56) References Cited

U.S. PATENT DOCUMENTS

| | | | |
|---|---|---|---|
| 7,736,038 | B2 | 6/2010 | Suzuki |
| 9,243,768 | B2 | 1/2016 | Minami et al. |

(Continued)

FOREIGN PATENT DOCUMENTS

| | | | |
|---|---|---|---|
| CN | 202501241 U | * | 10/2012 |
| JP | 4492637 B2 | | 6/2010 |
| WO | 2013132530 A1 | | 9/2013 |

OTHER PUBLICATIONS

Search English translation of CN-202501241-U (Year: 2012).*

*Primary Examiner* — Omar Rojas Cadima
(74) *Attorney, Agent, or Firm* — Young Basile Hanlon & MacFarlane, P.C.

(57) ABSTRACT

A light system comprising: one or more printed circuit boards; one or more lights located on the printed circuit board that generate light; and a personalized image device (PID) that creates an image which is visible from a location external to the light system.

20 Claims, 6 Drawing Sheets

(51) Int. Cl.

| | |
|---|---|
| ***F21V 23/00*** | (2015.01) |
| *F21W 103/60* | (2018.01) |
| *F21W 107/10* | (2018.01) |

(58) Field of Classification Search

CPC ...... B60K 35/22; B60K 35/211; B60K 35/21; B60K 2360/334

See application file for complete search history.

(56) References Cited

U.S. PATENT DOCUMENTS

| | | | | |
|---|---|---|---|---|
| 2005/0237757 | A1* | 10/2005 | Weng .................. | G02B 6/0021 362/545 |
| 2016/0161076 | A1* | 6/2016 | Shibata .................. | F21S 41/26 362/543 |
| 2017/0059108 | A1 | 3/2017 | Hardy et al. | |
| 2019/0322209 | A1* | 10/2019 | Sugiyama ............... | F21S 43/26 |

* cited by examiner

LIGHT SYSTEM WITH A CUSTOMIZABLE IMAGE REGION

FIELD

The present teachings relate to a light system with a region that displays images and the images may be changed and customized to display different images.

BACKGROUND

Vehicles include many different types of lights. Some types of lights included on a vehicle are low beam headlights, high beam headlights, taillights, turn signal lights, fog lights, running lights, or a combination thereof. Each of these lights extend out of an outer surface of a vehicle so that they provide light for the driver or provide notice to surrounding drivers. These light systems generally direct light outward from the vehicle. The light systems may have a predetermined light pattern that provides a regulatory function.

It would be desirable to have a light where a region of the light produces images, words, or both that are visible. There is a need for a light system that generates an image that appears on a lens of the light system. There is a need for a system where an image generated may be changed and/or customized. There is a need for a system where the image is generated with a pre-existing light. It would be desirable to have a light system where the light system provides uniform lighting and an image within the light system.

SUMMARY

The present teachings provide: A light system comprising: one or more printed circuit boards; one or more lights located on the printed circuit board that generate light; and a personalized image device (PID) that creates an image which is visible from a location external to the light system.

The present teachings provide: a light system comprising: a housing; one or more printed circuit boards comprising: a first connecting surface; a second connecting surface; and a thickness located between the first connecting surface and the second connecting surface, the thickness forming a periphery around the one or more printed circuit boards; wherein the one or more printed circuit boards are connected to the housing so that the thickness is in contact with the housing and the first connecting surface and the second connecting surface extend away from the housing.

The present teachings provide a light system comprising: a housing; a lens extending along a portion of the housing; two or more reflectors; one or more printed circuit boards comprising: a first connecting surface; a second connecting surface; and a thickness located between the first connecting surface and the second connecting surface, the thickness forming a periphery around the one or more printed circuit boards, wherein the one or more printed circuit boards extend between the two or more reflectors; one or more lights located on the printed circuit board that generate light; and a personalized image device (PID) that creates an image on an interior of the lens so that the image is visible from a location external to the light system; and wherein the one or more printed circuit boards are connected to the housing so that the thickness is in contact with the housing and the first connecting surface and the second connecting surface extend away from the housing.

The present teachings provide a light where a region of the light produces images, words, or both that are visible. The present teachings provide a light system that generates an image that appears on a lens of the light system. The present teachings provide a system where an image generated may be changed and/or customized. The present teachings provide a system where the image is generated with a pre-existing light. The present teachings provide a light system where the light system provides uniform lighting and an image within the light system.

DETAILED DESCRIPTION

Figure 1:
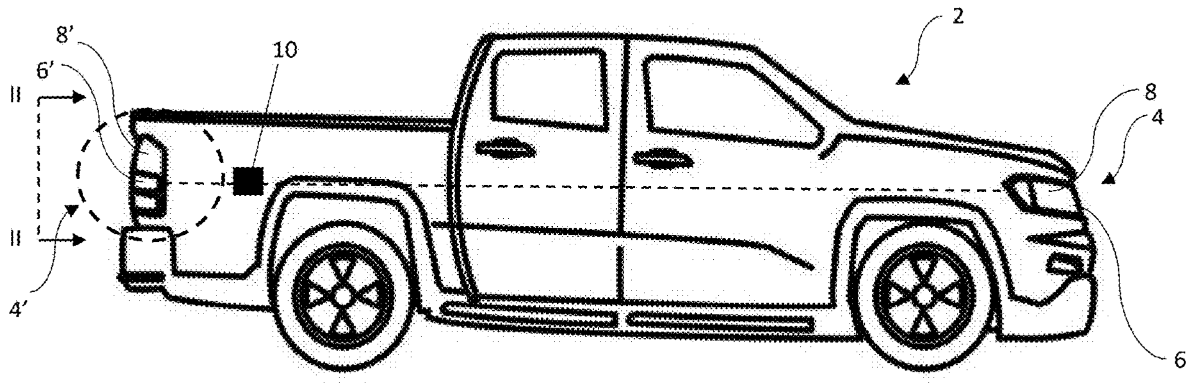
FIG. 1 is a side view of a vehicle including a light system.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings relate to a light system. The light system is located within a vehicle. Preferably, the light system is part of a vehicle such as a car, motorcycle, bus, truck, semi-truck, SUV, XUV, four-wheeler, dirt bike, tractor, combine, heavy equipment, farm equipment, industrial equipment, commercial equipment, or a combination thereof. The light system may project light in a forward direction, rear direction, side direction, vertical direction (e.g., z-axis), from a fore to an aft, an aft to a fore, or a combination thereof. The fore may be a forward direction of a vehicle or a front. The aft may be a rear direction of a vehicle or a rear. Preferably, the light system projects a light from an external surface of the vehicle to a location in front of the vehicle or at an angle relative to the front or rear of a vehicle. The light system may direct some light at the ground. The light system may direct some light above the ground. The light system may be integrated into a front end, a rear end, or both of a car. The light system may be an assembly. The light system may be a sealed light system that is integrated into a vehicle. The light system may be a sub-assembly that is included in a larger light system. The light system may be integrated into another light system and may function to be part of the light system. The light system may project light out of the vehicle. The light systems may be multiple light systems or light sources stacked one above the other, side by side, within different planes, within a same plane and projecting in different direction, integrated into a single light system, or a combination thereof. The light system may have multiple smaller light systems or light sources. The plurality of light systems or lights may be located in one light system. The plurality of light systems may operate independently of one another such that one light system may not affect another light system or portion of the light system. The light of the vehicle may be two or more, three or more, or four or more light systems located adjacent one another. The light system may be or include one or more static lights, one or more movable lights, and one or more light sources.

The light sources function to produce light. The light source may be a device or a plurality of devices that create light and the light extends outward from the light source. The light source may produce a high beam, a low beam, a blending beam, a running light, a daytime light, a turn signal, a brake light, or a combination thereof. The light sources may have different functions. For example, one light source may provide a running light and another light source may be a turn signal. Preferably, a first light source and a second light source combine together to provide a single light function. The light source may comprise a plurality of lights or may be a single light source within a set of light sources. The plurality of lights may be in one set or group of light sources. The plurality of lights may be located in rows, columns, a matrix, or a combination thereof. The light source may be a single light that projects light. In another example, a light source may direct light in a first direction and a second light source may direct light in a second direction that is different from the first direction. The lights may direct light to a reflector and the reflector may spread the light along a predetermined region, area, or both. The first light from a first light source and the second light from a second light source may extend in different directions but may be visibly combined to provide a light function. The first direction may be along a z-axis within a coordinate system. The second direction may be along an x-axis within a coordinate system.

The light sources may be any type of lighting device that produces light such as an incandescent bulb, fluorescent light, compact fluorescent lamp, halogen lamp, light emitting diode (LED), high intensity discharge lamps (HID); halogen lights, xenon lights, a laser diode, phosphorous bulb, or a combination thereof. The light sources may be a single lamp or bulb. Preferably, the light sources are part of a set of light sources that includes a plurality of lamps, bulbs, diodes, or a combination thereof. The light sources may be part of a set of light sources that includes 2 or more, 3 or more, 4 or more, 5 more, 7 or more, 9 or more, or 11 or more light sources that produce light and combine together to form the light extending from the light system. The sets of light sources may include 20 or less, 18 or less, 16 or less, or 14 or less devices that produce light (e.g., each set may include 8 light sources or alternatively all of the sets when combined together may include 8 light sources or 2 light sources). For example, the set of light sources may be the contents of a single printed circuit board that perform a same lighting function and the set of light sources may be 8 light sources that are all located on the single printed circuit board. The set of light sources may be two or more groups of lights that are located on different printed circuit boards. The printed circuit boards may be located adjacent to one another or spaced apart from one another. The number of light sources in a part of the light may dependent upon a size of the region or a size illuminated. For example, a daytime running light may have eight or more light sources and a turn signal may have five or more light sources. In another, example, the daytime running light may include two or more groups of light sources that are spaced apart from one another such that when the two or more groups of light sources are on they combine to provide the first light function.

The light source may be one or more lights, two or more lights, or three or more lights. The light source may be static. The light sources may be free of movement. The light source may be fixed. The light sources may be a row of lights, a column of lights, a matrix of lights extending in rows and columns, or a combination thereof. The light sources may be connected to a plurality of printed circuit boards that are located proximate to one another. The light sources may be static and may be manually or physically adjusted so that the light sources are directed to a desired location. The light sources may be fixed and the light from the light source may be moved, bent, directed, or a combination thereof by optical elements, textured portions, micro-optics, reflectors (e.g., a light guide), light blades, light pipes, or a combination thereof. Each individual light of the light source may be turned on and off. The light sources may provide light towards a reflector and then the reflector may redirect (i.e., reflect) the light in a second direction.

The light sources may produce two different light functions depending upon a region where the light is directed. The light sources of the light system may produce one light function and a second light source may produce a second light function. One light system (e.g., a brake light) may include a plurality of light sources (e.g., two or more) that produce one light function. The light system, via the light sources, may perform or provide one or more light functions, two or more light functions, or even three or more light functions. The light system may include perform or provide one or more light patterns, two or more light patterns, or three or more light patterns with a single light system. The light sources may be directed towards reflectors that produce a light function with a light pattern (e.g., a headlight). Some light sources may directly provide light and some light sources may indirectly provide light through a reflector.

The reflectors may all be located within a housing and function to redirect the light in a predetermined pattern. The reflectors may direct light between an upper housing and a lower housing. The reflectors may direct light through one or more lenses. The reflectors may all direct light and the light may combine to form a predetermined pattern. The reflectors may each provide light to a predetermined region to form part of a pattern, part of a function, or both. One reflector may be located adjacent to one light source or group of light sources. The reflectors may be a plurality of reflectors. The light system may include two or more, three or more, four or more, six or more, eight or more, ten or more, twelve or more, or even fourteen or more reflectors. The light system may include 50 or less, 40 or less, 30 or less, 20 or less, or 15 or less reflectors. The reflectors may extend coplanar to one another, in a generally arcuate line, along a curve, or a combination thereof. The light system may include reflectors that spread light within a predetermined region.

The first light function and the second light function may be different functions. The first light function and the second light function may operate at different times. The first light function and the second light function may be optically isolated. The first light function may provide a first light pattern, a second light function may provide a second light pattern, and a third light function may provide a third light pattern. The light functions may be right-handed light, left-handed light, standard light, or a combination thereof. The light functions may provide light based upon a position of a steering wheel, a lane of the vehicle, a country, or a combination thereof. The light functions may be changed by adjusting a light or a personalized image device (PID).

The PID functions to generate an image within a light system. The PID may directly project an image to a lens, indirectly project an image to a lens, illuminate a region of the lens that includes an image, or a combination thereof. The PID may be a single device or may be a combination of multiple devices. The PID may generate an image. The generated image may then be projected onto a lens. The PID may electrically create an image and project the image onto a lens such that the image may be customizable or dynamically changed. The lens they may allow the image to be viewed from an external location. The PID may generate single color images. The PID may generate images with more than one color. The PID may generate one or more, two or more, three or more, four or more, or even five or more different colors. The PID may have a set image and then light up the image so that the image is visible within the light system. The image may be changeable by changing a lens or a transparent material that extends over a light of the PID. Each lens or transparent material may be added and removed from the PID so that the images may be changeable. The PID may have a mask that may be added that creates an image when light shines thought the mask. The PID may project an image onto a PID reflector so that the image is reflected to a predetermined location or an image region.

The PID reflector functions to redirect light or images onto a lens. The PID reflector and the reflector may be made of a same material and may be substantially identical. The PID reflector may be a coated polymer, a metallized polymer, or both. The PID reflector may include or be coated with aluminum, silver, or some other reflective metal. The PID reflector direct light between reflectors. The PID reflector may reflect an image to the lens. The PID reflector may be aligned with the PID. The PID reflector may reflect light through a substrate that generates the image.

The substrate may provide a predetermined image. The substrate may be removable. The substrate may be movable so that the image may be changed or customized. The substrate may be substantially transparent, partially transparent, colored, or a combination thereof. The substrate may produce any of the images discussed herein.

The images may function to convey a message or a personalization of the vehicle. The images may be words, symbols, shapes, names, goods, emojis, designs, logos, art, one-of-a-kind material, or a combination thereof that is desired to be displayed. The images may be pre-loaded into the PID. The PID may have a directory of images that may be displayed (e.g., or the PID is capable of displaying). The PID may be connected to a database, a creation device, the internet, a memory device, an external memory device, or a combination thereof. The images may be displayed on an internal side of a lens and be visible from an exterior of the light system. The images may be added, changed, customized, or a combination thereof by a controller.

The controller may control what images are generated by the PID, displayed by the system, what images are available, or a combination thereof. The controller may dynamically change images, display images at predetermined times assist in creating images or adding images to the system, or a combination thereof. For example, the controller may display an image when the car is unlocked, locked, turned on, turned off, shifted into park, shifted into drive, shifted into reverse, the lights are turned on, or a combination thereof. The controller may determine a light color or image based upon a state of the vehicle, the light, or both. The controller may automatically change images or allow a user to change images. The controller may be part of the light system. The controller may be part of the vehicle. The controller may be in communication with the PID.

The one or more lenses function to illuminate, glow, provide light outside of the light system, provide an image, direct light, or a combination thereof. The one or more lenses function to receive light directly or indirectly from a light source. The lenses may function to protect the lights, the reflectors, or both. The lenses may bend light. The lenses may refract light. The lenses may diffuse the light, blend the light, spread the light, direct the light to a predetermined location, create one or more hot spots, create a homogeneous lighting appearance, prevent hot spots, or a combination thereof. The lenses may provide an image, shape, image region, or a combination thereof. The lens may be located in front of the reflectors. The lenses may cover all or a portion of the light system, the light source, light bars, light blade, reflectors, or a combination thereof. Each light system may include a lens. The light system may include a single lens that covers each of the reflectors or light sources that each provide or perform a different function. The lens may cover the reflectors, light source, or both so that light, direct light, reflected light, or a combination thereof extends through the lens. The lens may be one or more lenses. The lens may be a plurality of lenses. The lens (e.g., primary lens or internal lens) may be a single lens. The one or more lenses may have a shape that directs light to a predetermined location. The one or more lenses may be flat, planar, bio-convex, plano-convex, positive meniscus, negative meniscus, plano-concave, bio-concave, double convex, converging, diverging, or a combination thereof. Each lens may be a single lens. Each lens may be a compound lens (e.g., there may be more than one lens). Each lens has a forward side (or forward surface) and a rearward side (or rearward surface). The lens may include one or more texture portions. The lens may be an interior lens and may cover a headlight portion or a taillight portion of a light system.

The headlight may include one or more portions of a housing and an outer lens. The reflectors and light sources may be located internal of the housing and the outer lens. The housing functions to connect the light system within a vehicle, retain reflectors within a vehicle, hold the reflectors in a predetermined position, support two or more light sources relative to the reflectors, support one or more printed circuit boards relative to the reflectors and/or light sources, support two or more printed circuit boards, support a PID, support a PID reflector, or a combination thereof. The printed circuit boards may be a single centralized printed circuit board. The housing may be made of or include metal, plastic, a polymer, a polycarbonate, or a combination thereof. The housing may be substantially rigid, have flexible regions, movable regions, or a combination thereof. The housing may receive one or more fasteners or a plurality of fasteners. The housing may include walls such that the housing forms a box. The housing may include a bottom wall, first side wall, second side wall, fore wall, aft wall, or a combination thereof. The housing may be free of a top wall so that the top of the housing is open. The housing may be made up of an upper housing, a lower housing, an outer lens, or a combination thereof. The housing may be a monolithic piece. The housing, reflectors, printed circuit boards, or a combination thereof may include one or more heat sinks.

The printed circuit boards function to provide power to internal components of the light system. The printed circuit boards may provide power to one or more lights (e.g., light sources). The printed circuit boards may be connected to the upper housing, the lower housing, or both. The printed circuit boards may have a connection region (e.g., an area where components connect to the printed circuit boards) and an edge (e.g., a thickness forming a peripheral edge).

The connection regions may extend within a plane (e.g., has a length and a width). The connection region may have an area and the area may have a front side and a back side that are separated by the edge (e.g., thickness). The front connection region and the rear connection region may be parallel and spaced apart by the thickness.

The edges (e.g., thickness) may extend along an axis or a line. The printed circuit board may terminate at multiple edges that all have the same thickness. The edges may bound a plane that the printed circuit board extends through. One edge may be in communication with the housing. For example, a first edge may be fixedly connected to the lower housing so that the printed circuit board extends vertically (e.g., in a z-direction) away from the lower housing. Thus, the planes of the connection surfaces are orthogonal to a bottom wall of the lower housing. The edge may form a connection with the housing such that lights may be connected to both the front connection region and the rear connection region and direct light in opposing directions. The printed circuit board may be located on edge so that the printed circuit board cuts through a central region of the housing to direct light to two opposing sides of the housing. For example, the printed circuit board may bisect the housing so that about half of the light goes to a first side and about half of the light goes to a second side of the housing. The printed circuit board when located on edge may include lights that are located within the plane formed by the connecting surfaces. The lights may be spaced apart within an x-y coordinate system along the connecting surfaces. The lights may be located on virtually any location within the area so that light produced illuminates a desired region, is homogeneous, or both. The lights may be located on the connection surfaces in a line, randomly, symmetrically, asymmetrically, or a combination thereof. The printed circuit boards may extend within the housing so that the housing is divided into areas that form about 20% or more, about 30% or more, about 40% or more, or about 50% of a total area within the housing. For example, if one side is 20% then the other side is 80% if there is one printed circuit board. If there are more than two printed circuit boards then the areas formed on each side of the printed circuit boards may be equal, may not be equal, some of the areas may be equal and some of the areas may not be equal, or a combination thereof. The printed circuit board may extend within a single plane. The printed circuit board may be divided into two or more sections that are located within different planes (e.g., are non-coplanar) or extend at angles relative to one another.

The two or more sections function to direct light into two or more different directions. The two or more sections may be discrete sections. The two or more sections may be connected together. The two or more sections may be movable to an angle relative to one another. The two or more sections may be fixedly connected at an angle relative to one another. The angle between two of the two or more sections may be about 175 degrees or less, about 150 degrees or less, about 135 degrees or less, about 115 degrees or less, about 105 degrees or less relative to one another. The angle between two or more sections may be about 15 degrees or more, about 30 degrees or more, about 45 degrees or more, about 60 degrees or more, about 75 degrees or more, or about 85 degrees or more (e.g., about 90 degrees). The two or more sections may be located on edge so that the connecting surfaces are located at an angle relative to one another or the planes of the sections of the printed circuit boards are located at an angle relative to one another. The two or more sections of the printed circuit boards each include one or more lights, two or more lights, or three or more lights. The lights on the one or more printed circuit boards may direct light to one or more light tubes, one or more reflectors, directly to a lens, or a combination thereof.

The light tubes function to direct light to a predetermined location, generate one or more boost regions, or a combination thereof. The light tubes receive light at one end and provide the light to a second end. The light tube may direct light via total internal reflection. The light tube may provide the light to a specific area or region. The light tube may create a hot spot, boost region, or both.

The boost regions function to prevent shadowing of the lights. The boost region provides light in a specific area such that the entire light appears homogeneously lit. The boost region may increase an intensity of light within a specific area or region of the light system. The boost region may provide a higher intensity of light to indicate a change in motion, circumstances, vehicle speed, or a combination thereof. The boost region may provide an intensity of light that is greater than a standard intensity. The boost intensity may be about 1.5 lux or more, 2 lux or more, or 3 lux or more a normal intensity of the light under the same conditions (e.g., braking of a vehicle). The boost regions may be located on any side of the light system. The boost regions may be located on an edge of the light system. The boost regions may be located on a side of the light system that does not face a direction of motion (e.g., driver side or passenger side). The boost region may be a single boost region. The boost region may be a plurality of boost regions. The boost regions may all direct light in a same direction. The boost regions may direct light in different directions. The boost regions may be one or more region, two or more regions, three or more regions, or four or more regions. The boost regions may be ten or less, eight or less, or six or less regions. The boost regions may be located adjacent to or overlap one or more regions (e.g., standard regions) illuminated by the reflectors.

The reflectors function to spread light, redirect light, or both. The reflectors may extend along all or a portion of any area or region to be illuminated so that when light is directed to the reflectors the reflectors direct the light to the areas or the regions. The reflectors may be a reflective material. The reflectors may be a reflective polymer. The reflectors may be polished. The reflectors may be coated. The reflectors may redirect a predetermined amount of light. The reflectors may spread light, redistribute light, or both. Each reflector may provide light to predetermined location within the light system. Each of the areas of the light system created by the printed circuit boards may include one or more reflectors. The reflectors may direct light to a lens of the light system.

FIG. 1 illustrates a side view of a vehicle 2 including light systems 4 and 4'. The light system 4 includes a headlight and a personalized image device (PID) 6 covered by a lens 8. The light system 4' includes a taillight and a personalized image device (PID) 6' covered by a lens 8'. The light systems 4 and 4' are in communication with a controller 10 that that controls the light systems 4 and 4' and the PIDs 6 and 6'.

Figure 2:
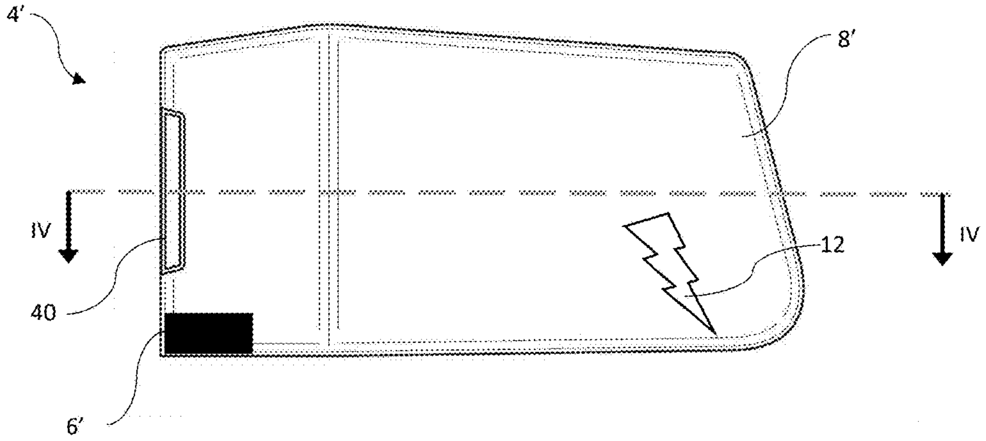
FIG. 2 is a plan view of the light system of FIG. 1 along line II-II.

FIG. 2 is a front view of the light system 4' of FIG. 1. The PID 6' is located behind a lens 8 of the light system 4. The PID 6' projects light or a shape towards the lens 8' so that an image 12 is generated on the lens 8'. A boost region 40 is located opposite the image.

Figure 3A:
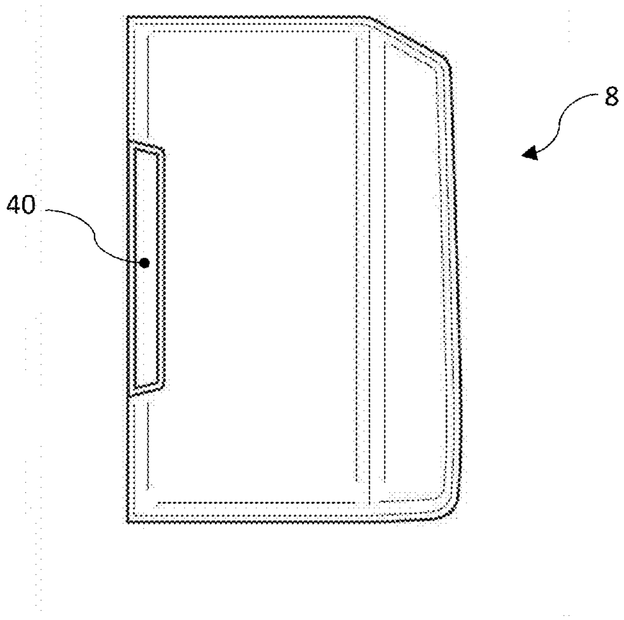
FIG. 3A is a side view of a light system.

FIG. 3A is a side view of a light system 4 with a boost region 40.

Figure 3B:
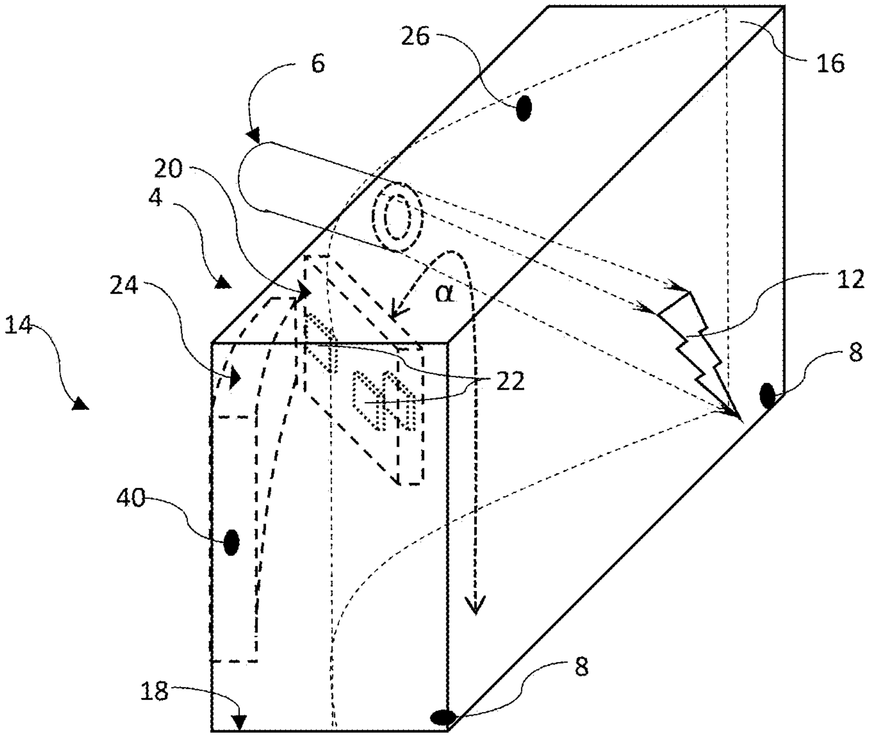
FIG. 3B is an isometric view of the light system of FIG. 3A.

FIG. 3B is an isometric view of the light system 4 of FIG. 3A. The light system 4 houses a PID 6 and includes a lens 8 where an image 12 is formed and displayed so that the image 12 is visible outside of the light system 4. The light system 4 includes a housing 14 that as shown is divided into an upper housing 16 and a lower housing 18. A printed circuit board 20 is located within the housing 14 and extends at an angle (a) relative to a bottom of the lower housing 18 so that the printed circuit board 20 is on edge. Lights 22 are located on the printed circuit board 20 to direct light through the lens 8. A light tube 24 extends from the printed circuit board 20 outward to form a boost region 40. A reflector 26 extends around the printed circuit board 20 and lights 22 to direct light outward through the lens 8.

Figure 3C:
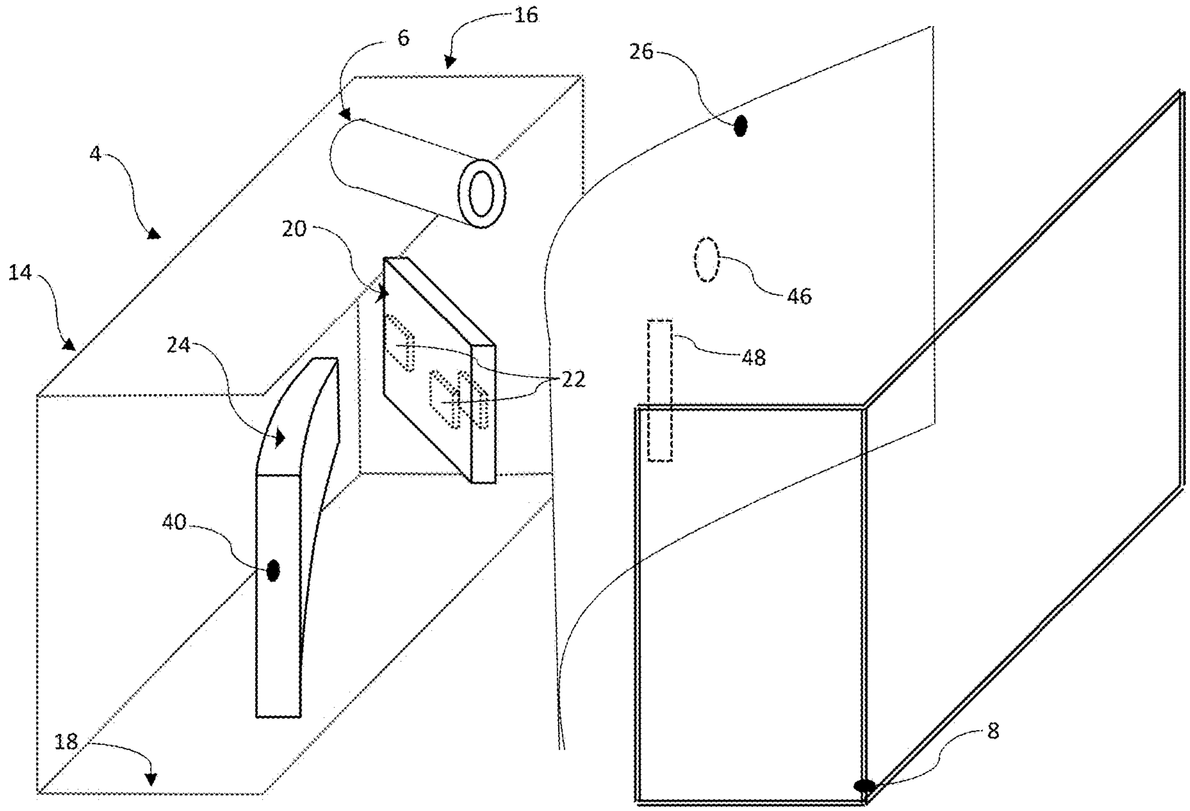
FIG. 3C is a partially exploded view of the light system of FIG. 3B.

FIG. 3C is partial exploded view of the light system 4. A forward end of the light system 4 includes a lens 8 that wraps from a front to a side of the flight system. A reflector 26 extends within a housing 14 of the light system 4 behind the lens 8. The housing 14 includes an upper housing 16 and a lower housing 18 that form an interior that holds all of the components of the light system 4. The reflector 26 includes a cutout 46 for the personalized image device 6 to project therethrough into contact with the lens 8. The reflector 26 further includes a cutout 48 a portion of the printed circuit board 20 to extend through. Light from the lights 22 on the printed circuit board 20 is directed towards the reflector 26 so that light is directed through the lens 9. A light tube 24 is aligned with the lights 22 to direct light through the side of the lens 8 to create a boost region 40.

Figure 4A:
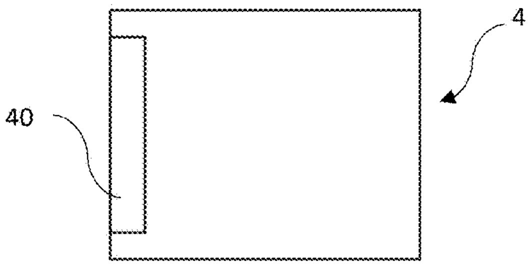
FIG. 4A is a plan view of a light system with a boost region.

FIG. 4A is a side view of a light system 4 showing a single boost region 40.

Figure 4B:
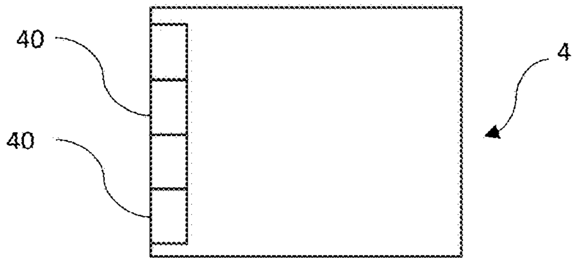
FIG. 4B is a plan view of a light system with multiple boost regions.

FIG. 4B is a side view of a light system 4 showing multiple boost regions 40.

Figure 5A:
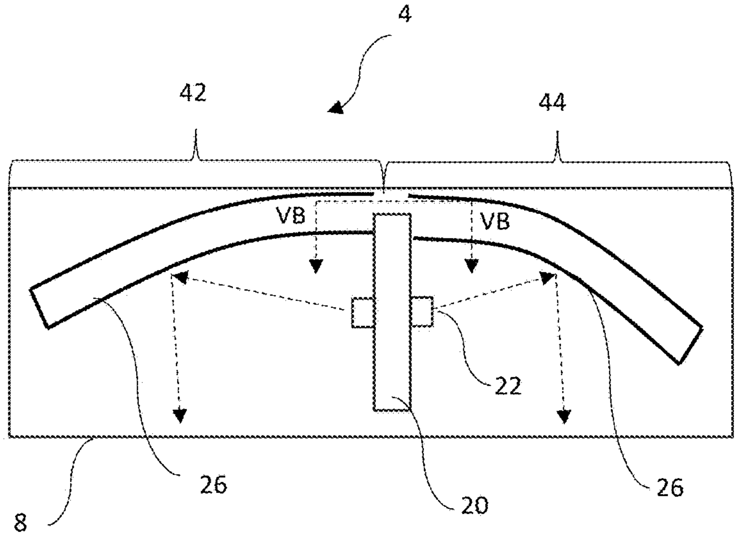
FIG. 5A is a top plan view of a light system.

FIG. 5A is a top view of a light system 4 that is divided into a first area 42 and a second area 44 by the printed circuit board 20 being located on edge. The first area 42 and the second area 44 include a reflector 26 that reflects light from the lights 22 to a lens 8 within the light system 4.

Figure 5B:
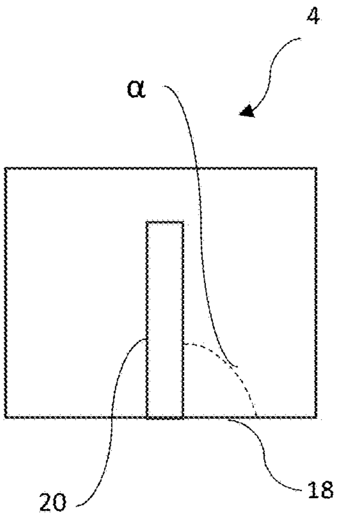
FIG. 5B is a partial front view of the light system of FIG. 5A along lines VB-VB.

FIG. 5B is partial cross-sectional view of FIG. 5A along lines VB-VB. The printed circuit board 20 is shown connected to the lower housing 18. The printed circuit board 20 extends at an angle (α) relative to the lower housing 18.

Figure 6:
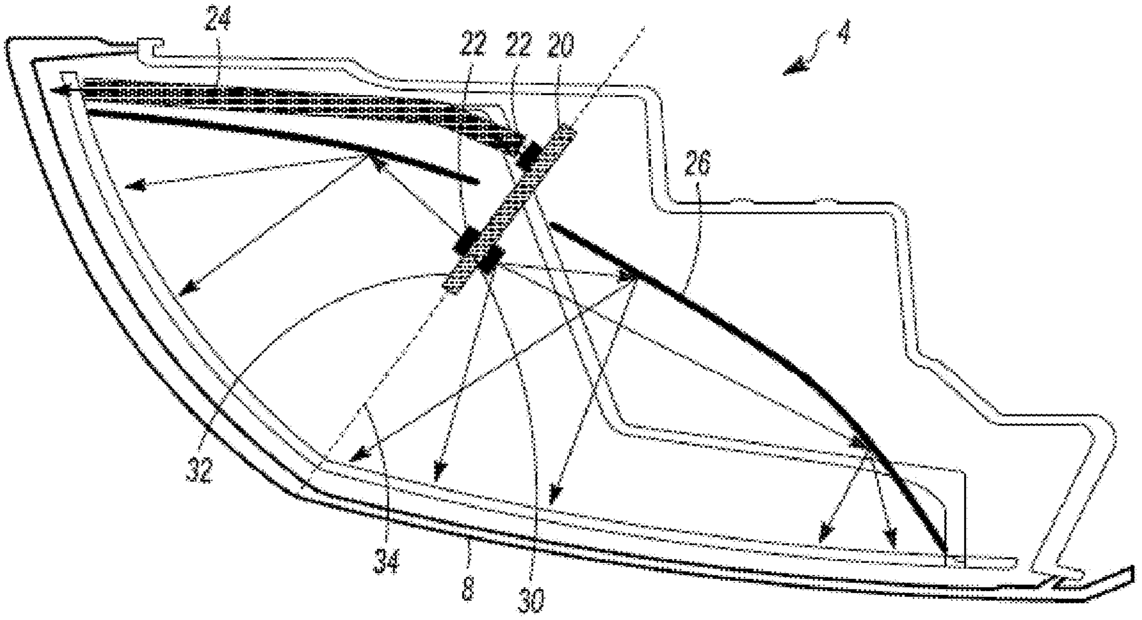
FIG. 6 is cross-sectional view of a light system including an image region.

FIG. 6 is a cross-sectional view of a light system 4. The light system 4 includes a lens 8 that forms an outer wall of the light system 4. The light system 4 includes a printed circuit board 20 with a plurality of lights 22. The printed circuit board 20 includes an edge 30 and a connecting surface 32. The plurality of lights 22 connected to the connecting surface 32 of the printed circuit board 20. As shown, the printed circuit board 20 is located on the edge 30 such that the edge 30 is vertical and the printed circuit board 20 extends in a vertical plane. The printed circuit board 20 has an axis 34 that is orthogonal to the lens 8 so that light from the plurality of lights 22 are spread outward relative to the axis 34 of the edge 30 of the printed circuit board 20. The light from some of the plurality of lights 22 is directed through a light tube 24 and some of the light from the plurality of lights 22 is directed to the reflectors 26. The light is then directed to the lens 8 so that that light is visible.

Figure 7:
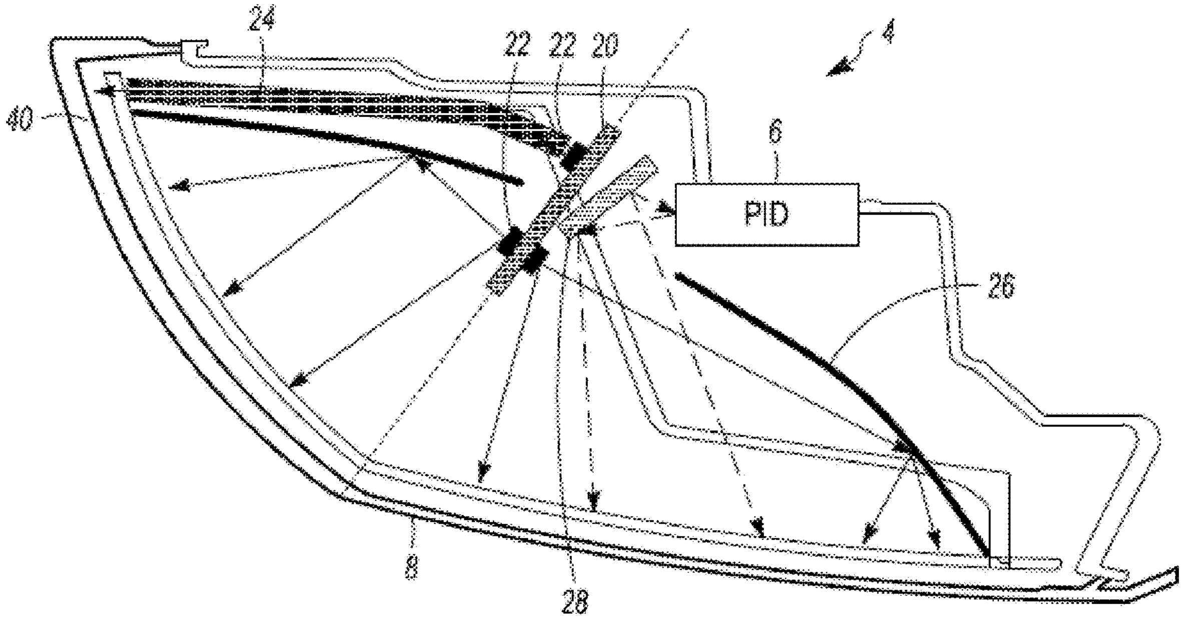
FIG. 7 is a cross-sectional view of a light system including an image region.

FIG. 7 is a cross-sectional view of a light system 4. The light system 4 includes a lens 8 that forms an outer wall of the light system 4. A PID 6 is located within the light system 4 behind the lens 8. The PID 6 generates light, an image, or both and directs the light, the image, or both to a PID reflector 28. The PID reflector 28 redirects the light, the image, or both onto the lens 8 so that an image (not shown) is visible on the lens 8. The light system 4 further includes a printed circuit board 20 that contains a plurality of lights 22. Some of the plurality of lights 22 project light into a light tube 24 that provides a concentrated amount of light to a predetermined region (e.g., a boost region 40). Some of the plurality of lights 22 provide light outward to reflectors 26 that redirect the light through the lens 8 to provide a light that is different than the light generated by the PID 6. The light from the PID 6 is directed around the reflector 26 so that an image is displayed on a lens 8.

Figure 8:
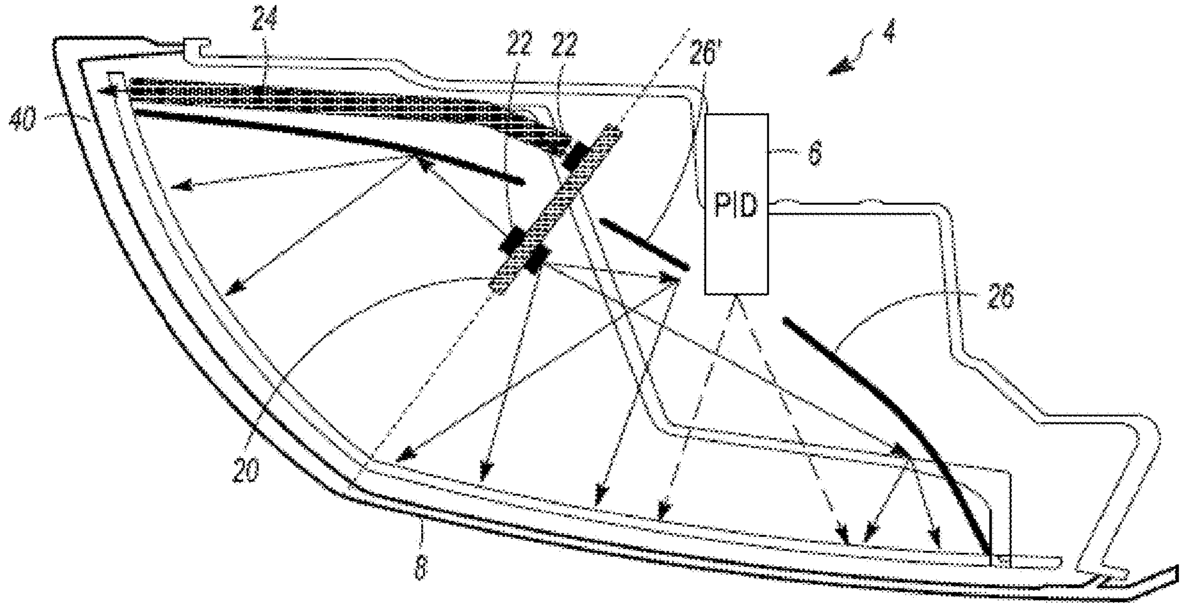
FIG. 8 is a cross-sectional view of a light system including an image region.

FIG. 8 is a cross-sectional view of a light system 4. The light system 4 includes a lens 8 that forms an outer wall of the light system 4. A PID 6 is located within the light system 4 behind the lens 8. The PID 6 generates light, an image, or both and directs the light, the image, or both directly onto a lens 8 so that an image is visible on the lens 8. The light system 4 further includes a printed circuit board 20 that contains a plurality of lights 22. Some of the plurality of lights 22 project light into a light tube 24 that provides a concentrated amount of light to a predetermined region (e.g., a boost region 40). Some of the plurality of lights 22 provide light outward to reflectors 26 that redirect the light through the lens 8 to provide a light that is different than the light generated by the PID 6. The light from the PID 6 is directed between the reflectors 26 and 26' so that an image is displayed on a lens 8 and the complete lens is illuminated with a homogeneous amount of light.

Figure 9:
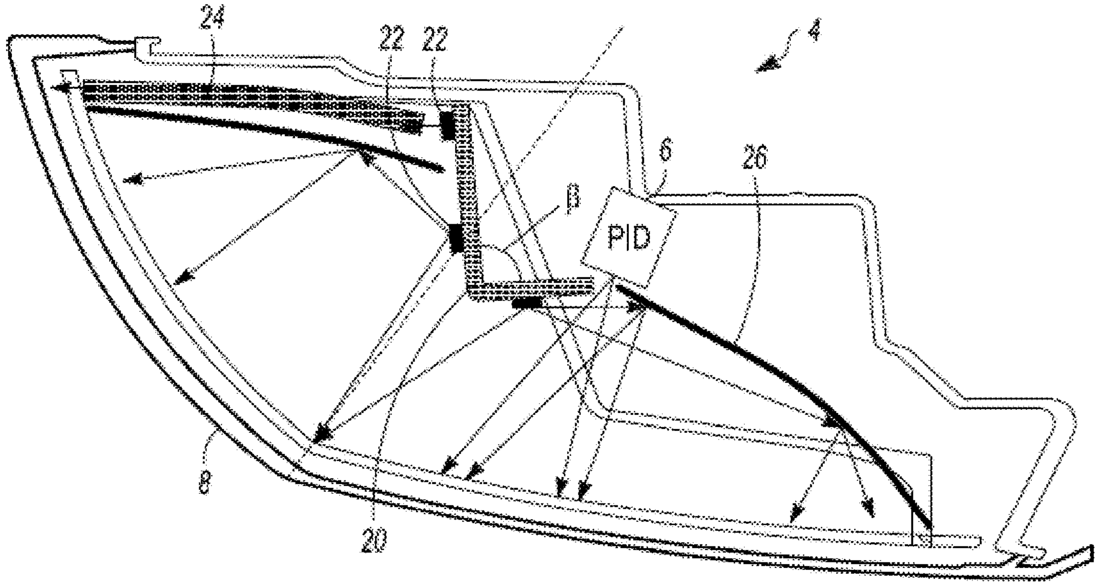
FIG. 9 is a cross-sectional view of a light system including an image region.

FIG. 9 is a cross-sectional view of a light system 4. The light system 4 includes a lens 8 that forms an outer wall of the light system 4. The light system 4 includes a printed circuit board 20 with a plurality of lights 22. The printed circuit board 20 includes an edge 30 and a connecting surface 32. The printed circuit board 20 may be bent and include a first section 36 and a second section 38 that extend at an angle (β) relative to one another. The plurality of lights 22 connected to the connecting surface 32 of the printed circuit board 20 and light is directed from the printed circuit boards 20 to different locations of the light system 4. As shown, the printed circuit board 20 is located on the edge 30 such that the edge 30 is vertical and the printed circuit board 20 vertically relative to a bottom of the light system 4. The light from some of the plurality of lights 22 is directed through a light tube 24 and some of the light from the plurality of lights 22 is directed to the reflectors 26. The light is then directed to the lens 8 so that that light is visible.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of or even consists of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

ELEMENT LIST

2 Vehicle
4 Light System
4' Light System
6 Personalized Image Device
6' Personalized Image Device
8 Lens
8' Lens
10 Controller
12 Image
14 Housing
16 Upper Housing
18 Lower Housing
20 Printed Circuit Board
22 Light
24 Light Tube
26 Reflector
28 PID Reflector
30 Edge
32 Connecting Surface
34 Axis
36 First Section
38 Second Section
40 Boost Region
42 First Area
44 Second Area
α First Angle
β Second Angle

We claim:

1. A light system comprising:
a lens;
two or more printed circuit boards;
one or more lights located on the two or more printed circuit boards that generate light; and
a personalized image device (PID) that creates an image on an internal surface of the lens, which is visible on the lens from a location external to the light system;
wherein the PID is separate from the two or more printed circuit boards and the PID directs light between two of the two or more printed circuit boards.

2. The light system of claim 1, further comprising:
a PID lens located between the PID and the lens, wherein the image created by the PID extends from the PID to the PID lens and then on the internal surface of the lens.

3. The light system of claim 1, further comprising:
two or more reflectors.

4. The light system of claim 1, further comprising:
one or more light pipes that guide light from one of the one or more lights on one of the two or more printed circuit boards to a boost region of the light system to provide light with a higher intensity than the light from the one or more lights on another of the two or more printed circuit boards that does not extend through the one or more light pipes.

5. The light system of claim 1, wherein the PID includes a directory of images that the PID is capable of displaying.

6. The light system of claim 1, wherein each of the two or more printed circuit boards comprise two opposing connecting surface separated by a thickness that forms a peripheral edge.

7. The light system of claim 6, wherein the two or more printed circuit boards are located within the light system on one side of the peripheral edge so that the two opposing connecting surfaces extend vertically within the light system.

8. The light system of claim 7, wherein vertical is a z-direction within an x, y, z coordinate system.

9. The light system of claim 3, wherein the image generated by the PID extends between the two or more reflectors and is projected on the internal surface of a lens.

10. The light system of claim 3, wherein the PID directs light between the two or more reflectors.

11. A light system comprising:
a housing;
one or more printed circuit boards comprising:
a first connecting surface;
a second connecting surface; and a thickness located between the first connecting surface and the second connecting surface, the thickness forming a peripheral edge of the one or more printed circuit boards;

one or more lights on the first connecting surface that direct light in a first direction, one or more lights on the second connecting surface that direct light in a second direction; and one or more light pipes that guide light from one of the one or more lights on the first connecting surface to a boost region of the light system to provide light with a higher intensity than the light from another of the one or more lights on the first connecting surface and the one or more lights from the second connecting surface that does not extend through the one or more light pipes;

wherein the one or more printed circuit boards are connected to the housing so that the thickness is in contact with the housing and the first connecting surface and the second connecting surface extend vertically away from the housing.

12. The light system of claim 11, further comprising:

two or more reflectors, wherein the one or more printed circuit boards extend between the two or more reflectors dividing the housing into at least a first area and a second area.

13. The light system of claim 11, further comprising:

two or more reflectors, wherein the one or more printed circuit boards extend between the two or more reflectors.

14. The light system of claim 13, further comprising:

a personalized image device (PID) that generates one or more images, an directs the one or more images between the two or more reflectors.

15. The light system of claim 14, wherein the PID is capable of dynamically changing the one or more images generated and the one or more images are projected on an interior surface of a lens of the light system.

16. A light system comprising:

a housing;

a lens extending along a portion of the housing;

two or more reflectors;

one or more printed circuit boards comprising:

a first connecting surface;

a second connecting surface; and a thickness located between the first connecting surface and the second connecting surface, the thickness forming a peripheral edge of the one or more printed circuit boards, wherein the one or more printed circuit boards extend between the two or more reflectors;

one or more lights located on the first connected surface and the second connecting surface of the printed circuit board that generate light; and a personalized image device (PID) that creates an image on an interior of the lens so that the image is visible on the lens from a location external to the light system;

wherein the one or more printed circuit boards are connected to the housing so that the thickness is in contact with the housing and the first connecting surface and the second connecting surface extend vertically away from the housing.

17. The light system of claim 16, wherein the one or more printed circuit boards extend vertically in a z-direction relative to the housing.

18. The light system of claim 16, wherein the PID is separate from the one or more printed circuit boards.

19. The light system of claim 16, further comprising:

a PID reflector that redirects the image from the PID to the interior of the lens.

20. The light system of claim 19, wherein the one or more printed circuit boards are a single printed circuit board that extends within the housing and the single printed circuit board comprises a first section and a second section that are located at an angle relative to one another so that the first section extends along a first plane and the second section extends along a second plane that is non-coplanar with the first plane.

* * * * *